2,871,231

THIAZOLEAZODIPHENYLAMINE COMPOUNDS

James M. Straley, David J. Wallace, and John G. Fisher, Kingsport, Tenn., assignors to Eastman Kodak Company, Rochester, N. Y., a corporation of New Jersey No Drawing. Application December 29, 1955
Serial No. 556,032

8 Claims. (Cl. 260—146)

This invention relates to certain metallized thiazoleazodiphenylamine compounds and their application to the dyeing or coloration of various materials.

The metallized compounds of our invention contain chromium, cobalt, copper, iron, manganese, nickel or vanadium in complex combination with a monoazo compound which is free of water-solubilizing groups and which has the formula:

(I)  R—N=N—Q wherein R represents the residue of a thiazole radical joined through the carbon atom in its 2-position to the azo bond shown and Q represents a diphenylamine radical joined through the carbon atom in its 4-position to the azo bond shown and which contains a hydroxy group, a methoxy group, an ethoxy group, a propoxy group, a butoxy group or a β-hydroxyethoxy group joined to the carbon atom in its 3-position.

While our invention relates broadly to the metallized monoazo compounds just described, the azo compounds of our invention are represented for the most part by the chromium, cobalt, copper, iron, manganese, nickel or vanadium form, particularly the nickel and cobalt form, of the azo compounds having the formula:

(II) 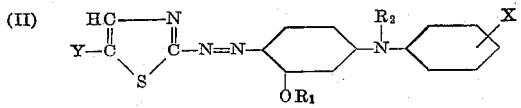

wherein $R_1$ represents a hydrogen atom or a methyl group, $R_2$ represents a hydrogen atom, a methyl group, a β-hydroxyethyl group or a β-cyanoethyl group, X represents a hydrogen atom, a methyl group, a methoxy group or a chlorine atom and Y represents a hydrogen atom, a methyl group or a nitro group.

The metallized monoazo compounds of our invention are prepared by treating the corresponding non-metallized monoazo compounds which are free of water-solubilizing groups and which have the formula designated I with salts of nickel, cobalt, copper, chromium, manganese, iron or vanadium. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam for a short time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [Ni(SCN)$_2$], cobaltous bromide, cobaltic chloride, cobaltous chloride, cobaltous acetate, cobaltous cyanide, cobalt thiocyanate [Co(SCN)$_2$], cupric chloride, cupric bromide, cupric acetate, cupric lactate, chromium trichloride, chromium tribromide, chromic sulfate, chromic acetate, chromium thiocyanate [Cr(SCN)$_3$], manganese chloride, manganous sulfate, manganese acetate, manganese thiocyanate [Mn(SCN)$_2$], ferric chloride, ferric fluoride, ferrous acetate, ferrous thiocyanate [Fe(SCN)$_2$], ferric thiocyanate [Fe(SCN)$_3$] and vanadium thiocyanate [V(SCN)$_2$] are illustrative of the metallizing agents that can be employed.

The non-metallized monoazo compounds which are free of water-solubilizing groups and which have the Formula I are prepared by diazotizing a 2-aminothiazole compound and coupling the diazonium compound obtained with a diphenylamine compound which contains a hydroxy group, a methoxy group, an ethoxy group, a propoxy group, a butoxy group or a β-hydroxyethoxy group joined to the carbon atom in its 3-position.

The non-metallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile, especially acrylonitrile graft polymers. After application to these materials, usually in the form of textile materials, the dye may be metallized thereon, if desired. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile, polymers, polyamides, methyl Cellosolve and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the non-metallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate, fiber the use of a metal thiocyanate appears to be advantageous and is preferred. Nickel thiocyanate appears to be especially useful and particular claim is laid to its use. Next to nickel thiocyanate the use of cobalt thiocyanate is preferred.

2-aminothiazole, 2-amino-4-methylthiazole, 2-amino-5-methylthiazole, 2-amino-4-trifluoromethylthiazole, 2-amino-5-nitrothiazole, 2-amino-4-methyl-5-nitrothiazole, 2-amino-4-n-butyl-5-nitrothiazole, 2-amino-4-cyano-5-nitrothiazole, 2 - amino - 4 - trifluoromethyl - 5 - carbomethoxythiazole, 2-amino-4-trifluoromethyl-5-carbethoxythiazole, 2-amino-4-trifluoromethyl-5-carbo-n-butoxythiazole, 2-amino-4-methylsulfonyl-5-nitrothiazole and 2-amino-4-n-butylsulfonyl-5-nitrothiazole are illustrative of the 2-aminothiazole compounds used in the preparation of the azo compounds of our invention. Other 2-aminothiazole compounds that can be employed are described and claimed in Towne and Hill U. S. application Serial No. 395,254, filed November 30, 1953 (2-amino-4-trifluoromethyl - 5 - carboalkoxythiazole compounds), now Patent No. 2,726,247, and Towne, Dickey and Bloom U. S. application Serial No. 490,113, filed February 23, 1955 (2 - amino - 4 - alkylsulfonyl - 5 - nitrothiazole compounds). Additionally U. S. Patent 2,683,708 discloses other suitable 2-aminothiazole compounds.

3 - hydroxydiphenylamine, 3 - hydroxy - 4' - methoxydiphenylamine, 3-hydroxy-4'-ethoxydiphenylamine, 3-hydroxy - 4' - n - propoxydiphenylamine, 3 - hydroxy-4' - isopropoxydiphenylamine, 3 - hydroxy - 4' - n - butoxydiphenylamine, 3-hydroxy-4'-methyldiphenylamine, 3 - hydroxy - 3' - methyldiphenylamine, 3 - hydroxy-4' - ethyldiphenylamine, 3 - hydroxy - 4' - n - butyldiphenylamine, 3 - hydroxy - 2' - chlorodiphenylamine, 3 - hydroxy - 3' - chlorodiphenylamine, N - methyl-3 - methoxydiphenylamine, N - ethyl - 3 - methoxydiphenylamine, N-n-propyl-3-methoxydiphenylamine, N-n-butyl-3-methoxydiphenylamine, 3-methoxydiphenylamine, 3-ethoxydiphenylamine, 3-n-propoxydiphenylamine, 3-n-butoxydiphenylamine, 3-isopropoxydiphenylamine, 3-β-hydroxyethoxy - N - β - hydroxyethyldiphenylamine, 3-β - hydroxyethoxy - N - β - hydroxyethyl - 4' - methoxydiphenylamine, 3 - β - hydroxyethoxy - N - β - hydroxyethyl - 2' - chlorodiphenylamine, 3 - methoxy - N - γ - hydroxypropyldiphenylamine, 3 - hydroxy - N - β - hydroxyethyldiphenylamine, 3 - hydroxy - N - γ - hydroxypropyldiphenylamine, 3 - methoxy - N - β - hydroxyethyldiphenylamine, 3 - hydroxy - 2 - methoxydiphenylamine, 3-hydroxy-2'-methyldiphenylamine, 3-hydroxy-2'-methoxy - N - β - hydroxyethyldiphenylamine, 3 - methoxy - N - δ - hydroxybutyldiphenylamine, 3 - hydroxy-N - β - hydroxyethyl - 2' - chlorodiphenylamine, 3 - hydroxy - N - β - cyanoethyldiphenylamine, 3 - methoxy-N - β - cyanoethyldiphenylamine, 3 - hydroxy - 2' - methoxy - N - β - hydroxyethyldiphenylamine, 3 - hydroxy-2' - chloro - N - β - hydroxyethyldiphenylamine, 3 - n-butoxy - N - β - hydroxyethyldiphenylamine, 3 - hydroxy-N - γ - cyanopropyldiphenylamine and 3 - methoxy - N-γ-cyanopropyldiphenylamine, for example, are illustrative of the diphenylamine compounds used in the preparation of the azo compounds of our invention.

Both the metallized and non-metallized monoazo compounds are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a $CH_2$=C< group, or an interpolymer of two or more of such monomers; and the grafting can be effected with the preformed homopolymer or interpolymer in the polymerization mixture in which it was formed (i. e. a live polymer) or with the preformed polymer isolated from the polymerization mixture in which it was formed (i. e. a dead polymer).

The preferred polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolyemer whereby the acrylonitrile alone or together with another grafting monomer is combined with the preformed polymer molecule to give a graft polymer containing from 5 to 95% by weight of combined acrylonitrile.

Insofar as acrylonitrile graft polymers are concerned, the new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U. S. Patent 2,620,324, issued December 2, 1952; U. S. Patent 2,649,434, issued August 18, 1953, and U. S. Patent 2,657,191, issued October 27, 1953, disclose other typical graft polymers that can be dyed with the new azo compounds of our invention.

Sulfone polyester textile materials that can be colored with the new azo compounds of our invention are disclosed in U. S. Patent 2,614,120, issued October 14, 1952. Additional sulfone polyester textile materials that can be colored with our new azo compounds are disclosed and claimed in copending Caldwell U. S. application Serial No. 313,061, filed October 3, 1952, now Patent No. 2,744,089.

Metallization will be described more particularly with reference to nickel and cobalt inasmuch as the metallized dyes containing these metals in complex combination appear to be advantageous. However, it will be clearly understood that the non-metallized azo compounds can be metallized with the other metals disclosed herein in accordance with the metallization procedure disclosed herein. The azo compounds disclosed herein have varying utility as dyes. The degree of utility varies, for example, depending upon the material being colored and the formula of the azo compound.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The following examples illustrate the compounds of our invention and their manner of preparation.

Example 1

3.8 grams of sodium nitrite were dissolved in 25 cc. of concentrated H₂SO₄ at 70° C. and the resulting nitrosyl sulfuric acid solution was cooled to 0° C. and 50 cc. of a mixture containing 1 part by volume of n-propionic acid to 5 parts by volume of acetic acid (this n-propionic-acetic acid mixture is hereinafter referred to as 1–5 acid) were added below 10° C. 7.25 grams of 2-amino-5-nitrothiazole in 50 cc. of 1–5 acid were added to the nitrosyl sulfuric acid mixture with good stirring at 0° C.–5° C. The reaction mixture resulting was stirred for 1.5 hours at a temperature below 5° C. The diazonium solution thus obtained was added, with stirring, at 5° C. to a solution of 12 grams of 3-hydroxy-4′-methoxydiphenylamine in 200 cc. of 1–5 acid. The reaction mixture was then stirred for 2 hours at room temperature to complete the coupling reaction which takes place and then drowned in 2000 cc. of water. The dye compound which precipitated was recovered by filtration, washed well with water, and dried in a vacuum at 50° C. 18 grams of the dye compound having the formula:

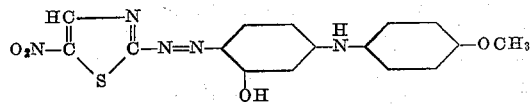

were obtained. It dyes cellulose acetate and acrylonitrile graft polymers blue-violet shades.

Example 2

5.6 grams of 2-amino-5-methylthiazole were diazotized and the diazonium compound obtained was coupled with 9.3 grams of 3-methylhydroxydiphenylamine. Diazotization, coupling and recovery of the dye compound formed were carried out in accordance with the general procedure described in Example 1. 13.2 grams of a dye compound which colored cellulose acetate orange shades and acrylonitrile graft polymers were obtained.

Example 3

5.6 grams of 2-amino-5-methylthiazole were diazotized and the diazonium compound obtained was coupled with 10 grams of 3-hydroxy-3′-methyldiphenylamine. Diazotization, coupling and recovery of the dye compound formed were carried out in accordance with the procedure described in Example 1. 13.1 grams of a dye compound which colored cellulose acetate orange shades and acrylonitrile graft polymers were thus obtained.

Example 4

8.4 grams of 2-amino-4-difluoromethylthiazole were diazotized and the diazonium compound obtained was coupled with 9.3 grams of 3-hydroxydiphenylamine. Diazotization, coupling and recovery of the dye compound formed were carried out in accordance with the procedure described in Example 1. 15.2 grams of a dye compound which colored cellulose acetate reddish-orange shades, nylon light fast red shades, and acrylonitrile graft polymers, were thus obtained.

Example 5

7.25 grams of 2-amino-5-nitrothiazole were diazotized and the diazonium compound obtained was coupled with 14 grams of 3-hydroxyethyldiphenylamine. Diazotization, coupling and recovery of the dye compound formed were carried out in accordance with the general procedure described in Example 1. 18 grams of a dye compound which colored cellulose acetate reddish-blue shades were obtained.

Example 6

A cellulose acetate fabric dyed with a 3% dyeing of the dye compound of Example 1 was padded with a 3% aqueous solution of nickel thiocyanate under conditions such that a 60–100% pick-up, based on the weight of the fabric, was obtained. The cellulose acetate fabric was then steamed for 10 minutes at 212° F., soaped for 10 minutes at 160° F., rinsed well with water, and dried. A deep blue-black dyeing which showed no bleeding or loss of color in a standard AATCC wash test at 160° F. was obtained. Further, the metallized dyeing showed no break after 20 hours' exposure on a Fade-Ometer, whereas the corresponding unmetallized dyeing faded badly.

The use of a 3% aqueous solution of cobalt thiocyanate in place of the nickel thiocyanate solution in the preceding paragraph gave substantially identical results.

Example 7

When a 3% dyeing on a cellulose acetate fabric with the dye product of Example 2 was treated with a 3% aqueous solution of nickel thiocyanate in accordance with the procedure described in Example 6, a violet-black dyeing was obtained. The use of a 3% aqueous solution of cobalt thiocyanate gave dyeings which were slightly bluer. Both dyeings possessed excellent fastness to light and washing.

Example 8

When a 3% dyeing on a cellulose acetate fabric with the dye product of Example 3 was treated with a 3% aqueous solution of nickel thiocyanate and with a 3% aqueous solution of cobalt thiocyanate respectively in accordance with the procedure described in Example 6, results similar to those obtained in Example 7 were obtained although the shades seemed slightly brighter and more intense. The dyeings obtained have excellent fastness to light and washing.

Example 9

When a 3% dyeing on a cellulose acetate fabric with the dye product of Example 4 was treated with a 3% aqueous solution of cobalt thiocyanate and a 3% aqueous solution of nickel thiocyanate respectively in accordance with the procedure described in Example 6, light-fast violet dyeings in which the wash fastness was greatly increased over that of the corresponding unmetallized dyeings were obtained.

Example 10

7.25 grams of 2-amino-5-nitrothiazole were diazotized and the diazonium compound obtained was coupled with 13 grams of 3-hydroxy-2′,5′-dimethoxydiphenylamine. Diazotization, coupling and recovery of the dye compound formed were carried out in accordance with the procedure described in Example 1. 17.8 grams of a dye compound which colored cellulose acetate blue shades were obtained. Metallization of the non-metallized dyeings with a 3% aqueous solution of cobalt thiocyanate and a 3% aqueous solution of nickel thiocyanate respectively in accordance with the procedure described in Example 6 gave dyeings in which the shade was not altered greatly, but in which the fastness of light and washing was greatly increased.

Example 11

1 gram of the dye product of Example 1 was refluxed in 16 cc. of acetone. 2.5 cc. of 28% ammonium hydroxide were added followed by 0.8 gram of nickelous acetate crystals in 16 cc. of hot acetone. The reaction mixture thus obtained was stirred and refluxed for 3 hours and then drowned in 400 cc. of water. The nickel complex of the monoazo compound of Example 1 which precipitated was recovered by filtration, washed well with water and dried. The dye compound thus obtained, when intimately dispersed in finely divided condition in a cellulose acetate-acetone dope solution in a concentration of 3% based on the weight of the cellulose acetate and extruded in the usual manner, gives deep reddish-blue shades having good resistance to the action of light and particularly to laundering.

Example 12

The nickel salt in Example 11 was replaced by an equivalent weight of cobaltous acetate crystals. The metallized dye obtained has properties quite similar to the metallized dye of Example 11.

the color of the non-metallized azo compound on cellulose acetate while "Final" refers to the color of the metallized azo compound on cellulose acetate.

| 2-Aminothiazole Diazo Component | Coupling Component | Metallizing Agent | Color on C. A. | | Color on Acrylonitrile Graft Polymer Original |
|---|---|---|---|---|---|
| | | | Original | Final | |
| Unsubstituted | 3-Hydroxy-3',4'-dimethoxydiphenylamine | Ni(SCN)₂ | violet | blue | |
| Do | do | Co(SCN)₂ | do | grey | |
| Do | 3-Hydroxy-3'-chlorodiphenylamine | Ni(SCN)₂ | orange | black | |
| Do | do | Co(SCN)₂ | do | violet | |
| Do | 3-Hydroxy-4'-ethoxydiphenylamine | Ni(SCN)₂ | red | black | |
| Do | do | Co(SCN)₂ | do | blue | |
| 5-Methyl | 3-Hydroxy-4'-methoxydiphenylamine | Ni(SCN)₂ | orange | black | |
| Do | do | Co(SCN)₂ | do | blue-black | |
| Do | 3-Hydroxy-3'-chlorodiphenylamine | Ni(SCN)₂ | do | black | |
| Do | do | Co(SCN)₂ | do | red-black | |
| Do | 3-Hydroxy-4'-methyldiphenylamine | Ni(SCN)₂ | red-orange | blue-black | |
| Do | do | Co(SCN)₂ | do | do | |
| 4-Trifluoromethyl | 3-Methoxy-N-β-cyanoethyldiphenylamine | Ni(SCN)₂ | orange | red | |
| Do | do | Co(SCN)₂ | do | do | |
| Do | 3-β-Hydroxyethoxy-N-β-hydroxyethyldiphenylamine | Ni(SCN)₂ | scarlet | do | red. |
| Do | do | Co(SCN)₂ | do | do | |
| 5-Nitro | 3-Hydroxy-3'-chlorodiphenylamine | Ni(SCN)₂ | blue | navy | blue. |
| Do | do | Co(SCN)₂ | do | do | |
| Do | 3-Methoxy-N-β-cyanoethyldiphenylamine | Ni(SCN)₂ | do | blue | Do. |
| Do | do | Co(SCN)₂ | do | do | |
| Do | 3-Hydroxy-N-β-hydroxyethyl-2'-methoxydiphenylamine | Ni(SCN)₂ | do | do | Do. |
| Do | do | Co(SCN)₂ | do | do | |
| Do | 3-Hydroxydiphenylamine | Ni(SCN)₂ | do | do | Do. |
| Do | do | Co(SCN)₂ | do | do | |
| Do | 3-Hydroxy-N-β-cyanoethyldiphenylamine | Ni(SCN)₂ | do | do | Do. |
| Do | do | Co(SCN)₂ | do | do | |
| Do | 3-Methoxy-N-β-hydroxyethyldiphenylamine | Ni(SCN)₂ | do | do | Do. |
| Do | do | Co(SCN)₂ | do | do | |
| Do | 3-Methoxy-N-methyldiphenylamine | Ni(SCN)₂ | do | do | Do. |
| Do | do | Co(SCN)₂ | do | do | |
| Do | 3-β-Hydroxyethoxy-N-β-hydroxyethyldiphenylamine | Ni(SCN)₂ | do | do | Do. |
| Do | do | Co(SCN)₂ | do | do | |
| 5-n-Butylsulfonyl | 3-β-Hydroxyethoxy-2'-methoxy-N-β-hydroxyethyldiphenylamine | Ni(SCN)₂ | red | violet | |
| Do | do | Co(SCN)₂ | do | do | |
| 5-Bromo | 3-Hydroxydiphenylamine | Ni(SCN)₂ | do | do | |
| Do | do | Co(SCN)₂ | do | do | |

*Example 13*

Example 2 was repeated except, that instead of drying, the moist dye cake was added to 500 cc. of water and brought to 60° C.–70° C. 95 cc. of a 20% aqueous nickel thiocyanate was added over a period of about 30 minutes and the reaction temperature was raised to 90° C., while keeping the reaction mixture alkaline by the addition of ammonium hydroxide or an aqueous sodium carbonate solution. When no more acid was generated, the hot, slightly alkaline reaction mixture was filtered and the metallized dye compound which collected on the filter was washed well with water and dried. When this dye compound is incorporated into a cellulose acetate-acetone dope solution in a concentration of 3% and a cellulose acetate dope solution is extruded in the usual manner, a cellulose acetate yarn having deep reddish-black shades of excellent resistance to light and laundering was obtained.

*Example 14*

When Example 13 was repeated using 95 cc. of a 20% aqueous cobalt thiocyanate solution as the metallizing agent, a metallized dye pigment slightly bluer and duller than that obtained in Example 13 was obtained. The cobalt dye pigment of this example has the same excellent fastness properties as the corresponding nickel dye pigment of Example 13.

Any of the diazo components disclosed herein can be coupled with any of the coupling components disclosed herein to obtain non-metallized monoazo compounds which, in turn, can be converted to the nickel, cobalt, copper, chromium, manganese, iron or vanadium complex using known metallization techniques. The following tabulation further illustrates the non-metallized and metallized azo compounds disclosed herein and sets forth the colors the non-metallized azo compounds color cellulose acetate and acrylonitrile graft polymers, as well as the colors obtained on cellulose acetate when the non-metallized azo compounds are metallized on the fiber. "C. A." refers to cellulose acetate, "Original" refers to the color of the non-metallized azo compound on cellulose acetate while "Final" refers to the color of the metallized azo compound on cellulose acetate.

The non-metallized monoazo dye compounds can be applied to cellulose alkyl carboxylic acid esters having 2 to 4 carbon atoms in the acid groups thereof, nylon, sulfone polyester, polyacrylonitrile, especially acrylonitrile graft polymers, and polyethylene terephthalate, textile materials and the metallized azo dye compounds can be applied to nitrogenous textile materials such as, for example, wool, silk, nylon and acrylonitrile polymers, in the form of an aqueous dispersion and are ordinarily so applied.

To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried. In the case of certain of the acrylonitrile graft polymers described hereinbefore it is necessary to dye at the boil for an extended period of time.

Instances may be encountered where the fiber is not satisfactorily colored by the dyeing procedure just described. In these instances special dyeing techniques, such as the use of pressure, for example, developed by the art for the coloration of materials difficult to color may be employed.

As previously indicated the nonmetallized azo compounds can be metallized on the materials they color. Thus, the metallized dyes can be used to color any materials the nonmetallized azo compounds color by metallizing the nonmetallized azo compounds on the materials to which they have been applied.

Widely varying amounts of dye can be used in the dyeing operation. The amount of dye used can be, for example, ⅓ to 3% (by weight) of that of the textile material although lesser or greater amounts of the dye can be employed.

The following example illustrates one satisfactory way in which the fibers of the acrylonitrile graft polymers can ordinarily be dyed using either the nonmetallized or metallized azo compounds. 16 milligrams of dye are ground with an aqueous solution of sodium lignin sulfonate until well dispersed or alternately the dye can be dissolved in 5 cc. of hot ethylene glycol monoethyl ether. The dispersion or solution, as the case may be, is then poured into 150 cc. of water to which a small amount of a surface-active agent such as Igepon T $(C_{17}H_{33}.CO.N(CH_3).C_2H_4SO_3Na)$ Nekal BX (sodium alkylnaphthalenesulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

Acrylonitrile graft polymers including those of the type described hereinbefore are described and claimed in Coover U. S. application Serial No. 408,012, filed February 3, 1954.

The diphenylamine coupling components used in the preparation of the azo compounds described herein are, for the most part, old compounds. The preparation of many of the coupling components is described or indicated, for example, in U. S. Patent 2,077,322. Their manner of preparation is further illustrated by the following examples.

Example A 40 grams of 3-methoxydiphenylamine, 18 cc. of glacial acetic acid, 18 cc. of acrylonitrile, 2 grams of cupric acetate and 4 grams of copper bronze were heated together in an autoclave at 150° C. for 8 hours. The reaction mixture thus obtained was distilled under reduced pressure. The fraction boiling at 176° C.–185° C./1.5 mm. was collected and consisted essentially of N-β-cyanoethyl-3-methoxydiphenylamine.

Example B 62 grams of 3-hydroxydiphenylamine, 38 grams of ethylene oxide and 125 grams of ethyl alcohol were heated together at 200° C. for 12 hours in an autoclave with agitation. Upon cooling, the contents of the autoclave were fractionally distilled. After removal of the ethyl alcohol, the following cuts were taken:

(1) B. P. 188° C.–194° C./0.5 mm.—27 grams
(2) B. P. 214° C.–217° C./0.3 mm.—37 grams On standing, cut No. 2 solidified and upon recrystallization from benzene melted at 74° C.–75° C. Cut No. 2 was found to be 3-β-hydroxyethoxy-N-β-hydroxyethyldiphenylamine while cut No. 1 was found to be 3-hydroxy-N-β-hydroxyethyldiphenylamine.

We claim:

1. A complex metal compound which contains a metal selected from the group consisting of chromium, cobalt, copper, iron, manganese, nickel and vanadium in complex combination with a monoazo compound which has the formula:

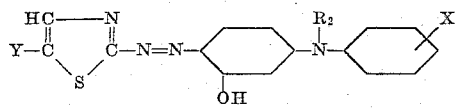

wherein $R_2$ represents a member selected from the group consisting of a hydrogen atom, a methyl group, a β-hydroxyethyl group and a β-cyanoethyl group, X represents a member selected from the group consisting of a hydrogen atom, a methyl group, a methoxy group and a chlorine atom and Y represents a member selected from the group consisting of a hydrogen atom, a methyl group and a nitro group.

2. Complex nickel compounds of the monoazo compounds which have the formula:

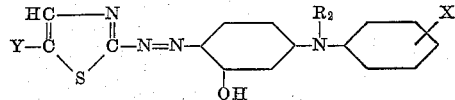

wherein $R_2$ represents a member selected from the group consisting of a hydrogen atom, a methyl group, a β-hydroxyethyl group and a β-cyanoethyl group, X represents a member selected from the group consisting of a hydrogen atom, a methyl group, a methoxy group and a chlorine atom and Y represents a member selected from the group consisting of a hydrogen atom, a methyl group and a nitro group.

3. Complex cobalt compounds of the monoazo compounds which have the formula:

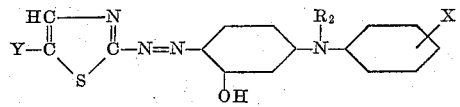

wherein $R_2$ represents a member selected from the group consisting of a hydrogen atom, a methyl group, a β-hydroxyethyl group and a β-cyanoethyl group, X represents a member selected from the group consisting of a hydrogen atom, a methyl group, a methoxy group and a chlorine atom and Y represents a member selected from the group consisting of a hydrogen atom, a methyl group and a nitro group.

4. A complex nickel compound of the azo compound having the formula:

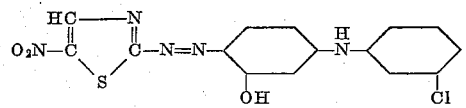

5. A complex nickel compound of the azo compound having the formula:

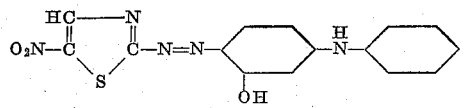

6. A complex nickel compound of the azo compound having the formula:

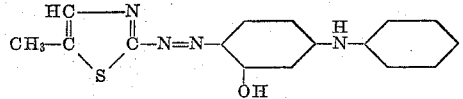

7. A complex nickel compound of the azo compound having the formula:

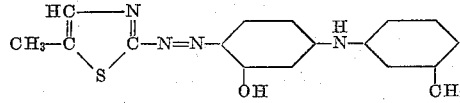

8. A complex cobalt compound of the azo compound having the formula set forth in claim 7.

References Cited in the file of this patent

UNITED STATES PATENTS

| | | |
|---|---|---|
| 2,109,552 | Schindhelm et al. | Mar. 1, 1938 |
| 2,683,709 | Dickey et al. | July 13, 1954 |

OTHER REFERENCES

Crossley: "Metallized Azo Dyes," American Dyestuff Reporter, March 7, 1938, pp. P124–P125.

Dorman: "Chrome Azo Dyes," American Dyestuff Reporter, February 1, 1943, pages 47–49.

Venkataraman: Synthetic Dyes, 1952, pages 523–524.